United States Patent [19]

Iwata et al.

[11] Patent Number: 5,463,747
[45] Date of Patent: Oct. 31, 1995

[54] MICROPROGRAM DATA PROCESSOR PROCESSING OPERAND ADDRESS CALCULATION AND INSTRUCTION EXECUTION WITH COMMON HARDWARE

[75] Inventors: Shunichi Iwata; Toru Shimizu, both of Itami, Japan

[73] Assignee: Mitsubishi Denki Kabushiki Kaisha, Tokyo, Japan

[21] Appl. No.: 266,400

[22] Filed: Jun. 27, 1994

[30] Foreign Application Priority Data

Jun. 28, 1993 [JP] Japan .................................. 5-156545

[51] Int. Cl.⁶ .............................. G06F 9/26; G06F 9/30; G06F 9/32; G06F 12/00
[52] U.S. Cl. ................... 395/375; 364/259.9; 364/262.8; 364/263.1; 364/266.3; 364/DIG. 1
[58] Field of Search ...................... 395/375, 400

[56] References Cited

U.S. PATENT DOCUMENTS

| | | | |
|---|---|---|---|
| 4,870,567 | 9/1989 | Kitamura et al. | 395/375 |
| 5,129,068 | 7/1992 | Watanabe et al. | 395/400 |
| 5,187,782 | 2/1993 | Kawasaki et al. | 395/375 |
| 5,247,625 | 9/1993 | Yoshitake et al. | 395/375 |

FOREIGN PATENT DOCUMENTS 1-50934 11/1989 Japan .

Primary Examiner—Kevin J. Teska
Assistant Examiner—Ayni Mohamed
Attorney, Agent, or Firm—Lowe, Price, LeBlanc & Becker

[57] ABSTRACT

A data processor, comprises: a microaddress input selector 252 which, when decoding an instruction code, generates a main microaddress signal 212 corresponding to an operation code part, a submicroaddress signal 218 corresponding to an addressing mode designating part and an address calculation request signal 233 indicating whether address calculation is necessary or not, and selects an address signal corresponding to an operation code part or to an addressing mode designating part responsive to the address calculation request signal 233; and an instruction execution control unit control circuit 256 which controls the microaddress input selector 252; and is capable of executing the instruction having the addressing mode designating part independent from the operation code, rapidly and with a small microprogram size.

12 Claims, 11 Drawing Sheets

FIG. 4

| OPERATION OF MICROPROGRAM ROUTINE DESIGNATED BY MICROSEQUENCE CONTROL SIGNAL 261 | VALUE SELECTED BY MICROADD. INPUT SELECTOR 252 |
|---|---|
| "exit" FINISH OF OPERATION | ADD. CALCULATION REQUEST SIGNAL 223 = 0: MAIN MICROADD. SIGNAL 212 FROM INSTRUCTION DECODING UNIT 107 = 1: SUBMICROADD. SIGNAL 218 |
| "return" FINISH OF ADD. CALCULATION | MAIN MICROADD. SIGNAL FROM INSTRUCTION EXECUTION CONTROL UNIT 108 |
| "goto" MICROJUMP | NEXT MICROADD. SIGNAL 262 DESIGNATED BY MICROINSTRUCTION |
| "go/ex" GOTO OR EXIT | ADD. CALCULATION REQUEST SIGNAL 223 = 0: SAME AS "exit" = 1: SAME AS "goto" |
| "go/ret" GOTO OR RETURN | OPERAND FETCH REQUEST SIGNAL 213 = 0: SAME AS "return" = 1: SAME AS "goto" |

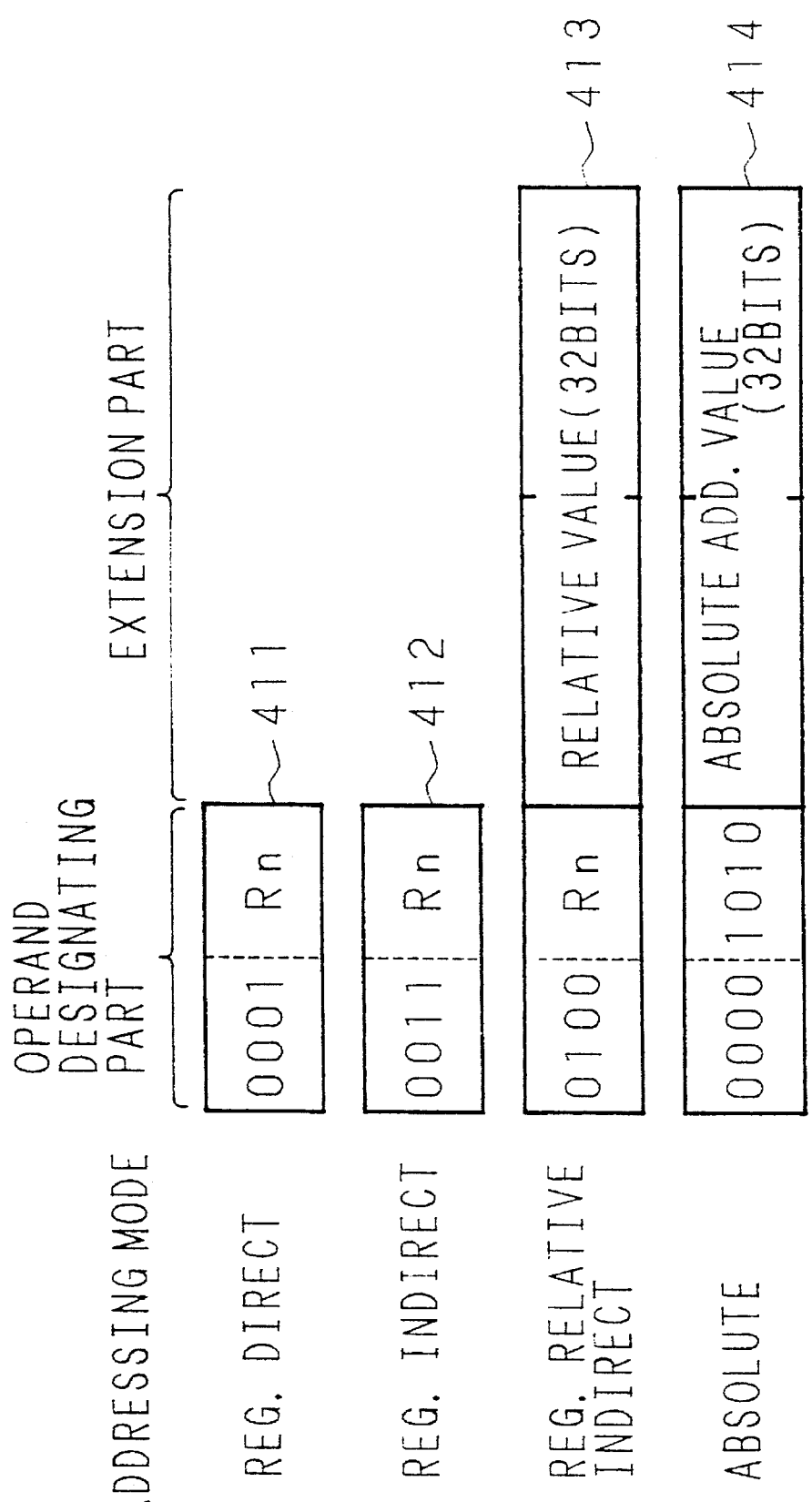

FIG. 8A  MOV:G R0,R1

| OPCD1 | 0001 | 0000 | OPCD2 | 0001 | 0001 |
|---|---|---|---|---|---|

(R0)(REG. DIRECT)　　　　(R1)(REG. DIRECT)

421

FIG. 8B  MOV:G @R2,@H'12345678

| OPCD1 | 0010 | 0010 | OPCD2 | 0000 | 1010 | H'12345678 |
|---|---|---|---|---|---|---|

(R2)(REG. INDIRECT)　　　　(ABSOLUTE)(MEMORY ADD.)

422

FIG. 8C  MOV:S R3,R4

| OPCD3 | 0011 | 0001 | 0100 |
|---|---|---|---|

(R3)(REG. DIRECT)(R4)

423

FIG. 8D  MOV:S R5,@(R6+H'00001000)

| OPCD3 | 0101 | 0100 | 0110 | H'00001000 |
|---|---|---|---|---|

(R5)(REG. RELATIVE)(R6)

| | (A) | | (B) | | (C) | (D) |
|---|---|---|---|---|---|---|
| | 1st OPERAND | 2nd OPERAND | 1st OPERAND | 2nd OPERAND | | |
| MAIN MICROADD. SIGNAL 212 | movs 1 | movs 2 | movs 1 | movs 2 | movs | movs |
| SUBMICROADD. SIGNAL 218 | X | X | @Rn | @abs | X | @Rn+exp |
| OPERAND FETCH REQUEST SIGNAL 213 | 1 | 0 | 1 | 0 | 0 | 0 |
| SUBDECODER EFFECTIVE SIGNAL 214 | 1 | 1 | 1 | 1 | 1 | 1 |
| REG./MEMORY SIGNAL 219 | 0 | 0 | 1 | 1 | 0 | 1 |
| ADD. CALCULATE REQUEST SIGNAL 223 | 0 | 0 | 1 | 1 | 0 | 1 |
| 1st REG. No. SIGNAL 215 | X | X | X | X | R3 | R5 |
| 2nd REG. No. SIGNAL 220 | R0 | R1 | R2 | X | R4 | R6 |
| EXTENSION PART DATA SIGNAL 232 | X | X | X | 12345678 | X | 00001000 |

X : don't care

MICROPROGRAM DATA PROCESSOR PROCESSING OPERAND ADDRESS CALCULATION AND INSTRUCTION EXECUTION WITH COMMON HARDWARE

BACKGROUND OF THE INVENTION

1. Field of the Invention

The present invention relates to a data processor of a microprogram control system, and more particularly, to a data processor which controls operand address calculation and instruction execution by microprograms.

2. Description of the Related Art

In a data processor of a microprogram control system, microprograms are stored in a memory called a micro-ROM beforehand. The data processor then decodes an operation code in an instruction code to generate a start address in the micro-ROM of a corresponding microprogram routine, and sequentially reads out microinstructions from the start address to execute the instruction by controlling the operation of a register or an operation unit.

In formats of the instruction code processed by such a data processor of the microprogram system, there are the format whereby an operand addressing mode is decided by the operation code, and the format in which a field designating the operand addressing mode is independent from the operation code and the addressing mode can be designated for every operand.

In the data processor of the microprogram control system which processes the instruction wherein the addressing mode designation is independent from the operation code, exclusive hardwares for operand address calculation are provided in many cases. In such hardwares, at the time of decoding the instruction, the operation code is decoded to generate a microprogram address, and also an addressing mode designating part is decoded to generate a control code for address calculation. The instruction is executed by the microprogram corresponding to the operation code after calculating the address.

However, in the data processor of the microprogram control system in which the exclusive hardwares for operand address calculation can not be provided due to restriction in sizes of the hardwares, the operand address calculation and instruction execution are processed in the same hardwares. In such a data processor, in some cases, a method of determining the addressing mode by the microprogram to change a microprogram sequence, or to call a subroutine for operand address calculation is adopted. However, in case of adopting this method, since the microprogram for determining the addressing mode is a must, a processing time is prolonged in response thereto.

There is also the case of adopting a method of decoding the operation code and the addressing mode designating part simultaneously at the time of instruction decoding to generate the microprogram address for every addressing mode. In the data processor adopting this method, though the execution time is shortened because the microprogram for determining the addressing mode is not necessary, since it is necessary to prepare the microprogram in response to all addressing modes which can be used for respective operation codes so as to be stored in the micro-ROM, the number of words of the microprogram increases and a capacity of the micro-ROM for storing the words becomes larger.

As described above, in the conventional data processor of the microprogram control system in which the operand address calculation and instruction execution are processed in the same hardwares, the following problems are encountered when executing the instruction having the addressing mode designating part which is independent, from the operation code.

Firstly, in the data processor, in which the addressing mode is determined by the microprogram, and the microprogram execution sequence is changed or the subroutine for address calculation is called in response to the result of the determination of the addressing mode, since the microprogram for determining the addressing mode is necessary, the processing time is prolonged in response thereto.

Secondly, in the data processor, in which the microprogram corresponding also to the addressing mode is executed from the beginning, by simultaneously decoding both the operation code and the addressing mode designating part at the instruction decoding stage to generate the microprogram address, since the microprograms by the number of addressing modes which can be designated for every operation code are necessary, the number of words of the microprograms increases. Thus, a capacity of the micro-ROM must be enlarged to store the words.

SUMMARY OF THE INVENTION

The present invention has been devised to solve such problems. Therefore, it is a primary object thereof to provide a data processor of a microprogram control system, which processes operand address calculation and instruction execution by using the same hardwares, and is capable of executing instructions having an addressing mode designating part, which is independent from an operation code, rapidly and with a small microprogram size.

The data processor according to the present invention comprises: decoding means constituted by a main decoder which decodes an operation code part in an instruction code to generate a start address (microprogram address for instruction execution) of a microprogram routine for controlling instruction execution, and a subdecoder which decodes the addressing mode designating part in the instruction code to generate a start address (microprogram address for address calculation) of a microprogram routine for controlling operand address calculation; selecting means (microaddress input selector) for selecting any of the microprogram address for instruction execution, microprogram address for address calculation and other microprogram address as an address of the microprogram to be executed next; and controlling means (instruction execution control unit control circuit) for controlling the selective operation of the selecting means on the basis of a first control signal (address calculation request signal) indicating whether or not the address calculation is necessary, a second control signal (operand fetch request signal) including whether or not the operand is to be read from a memory, and a third control signal (operand write request signal) indicating whether or not the operand is to be written into the memory.

The data processor according to the present invention further comprises, holding means (registers) which holds the microprogram address for instruction execution for a predetermined period, whereby the selecting means selects the microprogram address for instruction execution previously decoded by the decoding means held by the holding means, at the time point where a sequence control signal (microsequence control signal) of the microinstruction indicating that the address calculation is finished is outputted.

In the data processor according to the present invention, at the time of executing the instruction in which, for example, the operand is the register where the address calculation is not necessary, the address calculation request signal which is the first control signal is "invalid", and the microprogram address for instruction execution is selected to execute the instruction. While, at the time of executing the instruction in which, for example, the operand is the memory where the address calculation is necessary, the address calculation request signal is "valid", and the microprogram address for address calculation is selected for operand address calculation. When the operand fetch request signal, which is the first control signal, is "valid", the microprogram address for memory read is selected and the operand is read from the memory immediately after the operand address calculation is finished, and when "invalid", the microprogram address for instruction execution is selected immediately after the operand address calculation is finished. When the operand write request signal, which is the second control signal, is "valid", the microprogram address for memory write is selected and the operand is written into the memory immediately after the instruction execution is finished, and when "invalid", the microprogram address corresponding to a new operation code is selected immediately after the instruction execution is finished.

Meanwhile, the microprogram address for instruction execution previously decoded is held in the register as the holding means. And hence, when the address calculation or memory read is finished and the microsequence control signal becomes "valid", the microprogram address for instruction execution held in the register is selected and the instruction is executed successively after the address calculation.

The above and further objects and features of the invention will more fully be apparent from the following detailed description with accompanying drawings.

BRIEF DESCRIPTION OF THE DRAWINGS

FIG. 4 is a view explaining the operation of a microaddress input selector of a data processor of the present invention, FIG. 7 is a schematic view showing an example of formats of an operand designating part of an instruction format processed by a data processor of the present invention, FIG. 8A is a schematic view showing an example of general format of a register to register transfer in instruction codes of MOV instructions (data transfer instructions) processed by a data processor of the present invention, FIG. 8B is a schematic view showing an example of general format of a memory to memory transfer in instruction codes of the same, FIG. 8C is a schematic view showing an example of short format of a register to register transfer in instruction codes of the same, FIG. 8D is a schematic view showing an example of short format of a memory to memory transfer in instruction codes of the same, FIG. 9 is a table showing output signals in an instruction decoding unit in case of executing instruction codes shown in FIG. 8A, FIG. 8B, FIG. 8C and FIG. 8D.

DESCRIPTION OF THE PREFERRED EMBODIMENTS

Figure 1:
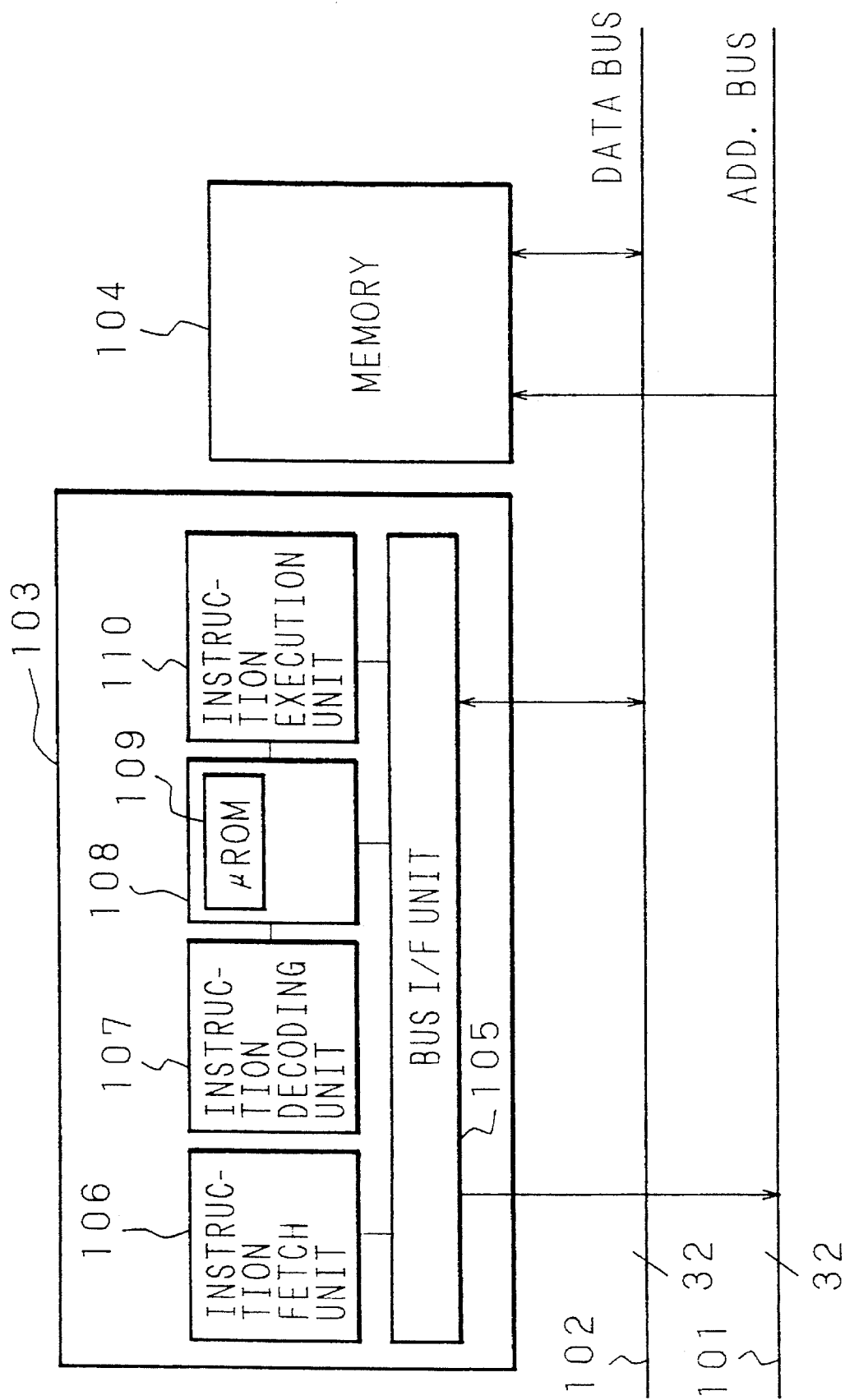
FIG. 1 is a block diagram showing a whole configuration of a data processor of the present invention.

In the following, the present invention is particularly described referring to the drawings showing its embodiments.

FIG. 1 is a block diagram showing a general configuration of a data processor of the present invention and its connections with an external memory 104.

In FIG. 1, numeral 101 designates an address bus, numeral 102 designates a data bus, numeral 103 designates a processor as the data processor of the present invention, and numeral 104 designates an external memory of the processor 103.

The memory 104 and the processor 103 are connected by the address bus 101 and the data bus 102.

The processor 103 consists of a bus I/F unit 105, an instruction fetch unit 106, an instruction decoding unit 107, an instruction execution control unit 108, an instruction execution unit 110 and so on.

A micro-ROM 109 is included in the instruction execution control unit 108.

The bus I/F unit 105 is connected to the memory 104 through the address bus 101 and the data bus 102, and accesses instructions and data against the memory 104.

The instruction fetch unit 106 is connected to the bus I/F unit 105 and the instruction decoding unit 107, and controls the instruction fetch request to the bus I/F unit 105 and the output of the instruction fetched by the bus I/F unit 105 to the instruction decoding unit 107.

The instruction decoding unit 107 is connected to the instruction fetch unit 106 and the instruction execution control unit 108, and decodes the instruction received from the instruction fetch unit 106 so as to output information necessary for the instruction to the instruction execution control unit 108.

The instruction execution control unit 108 is connected to the bus I/F unit 105, instruction decoding unit 107 and instruction execution unit 110. The micro-ROM 109 which is a memory storing the microprogram is built in the instruction execution control unit 108, which accesses the micro-ROM 109 in response to the information outputted from the instruction decoding unit 107 to fetch the microinstruction, and decodes the fetched microinstruction to output various control signals for controlling the instruction execution unit 110.

The instruction execution unit 110 is connected to the instruction execution control unit 108 and to the bus I/F unit 105, and executes the instruction according to the control signal outputted from the instruction execution control unit 108.

Figure 2:
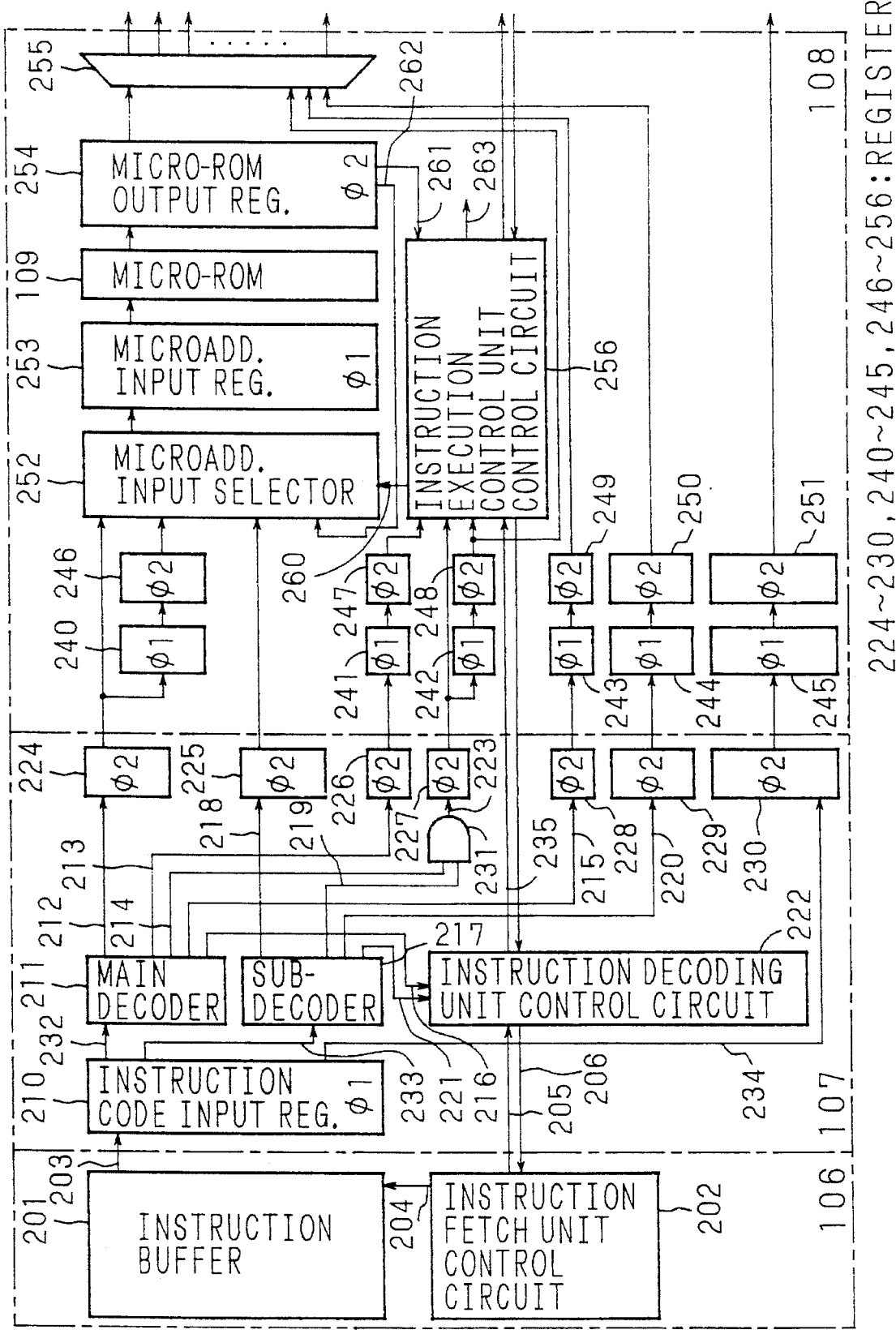
FIG. 2 is a block diagram showing a detailed configuration of an instruction fetch unit, an instruction decoding unit and an instruction execution control unit of a data processor of the present invention.

FIG. 2 is a block diagram showing a detailed configuration of the instruction fetch unit 106, instruction decoding unit 107 and instruction execution control unit 108 shown in FIG. 1.

Connection between the instruction fetch unit 106 and the bus I/F unit 105 is omitted in FIG. 2.

In FIG. 2, reference characters $\phi 1$ and $\phi 2$ designate clocks.

Figure 3:
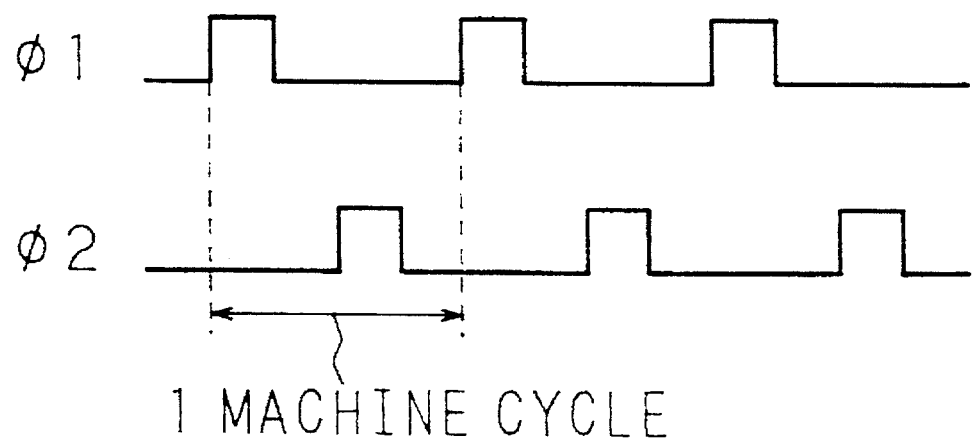
FIG. 3 is a waveform diagram of a non-overlap 2-phase clock used ill a processor of a data processor of the present invention.

FIG. 3 is a waveform diagram showing waveforms of the clocks $\phi 1$, $\phi 2$ used in the data processor or the processor 103 of the present invention.

The clocks $\phi 1$, $\phi 2$ are the so-called non-overlap 2-phase clock, wherein the clock $\phi 1$ becomes high level first in one machine cycle, and the clock $\phi 2$ becomes high level after the clock $\phi 1$ becomes low level, thereby the high level periods do not overlap one another.

The instruction fetch unit 106 is mainly constituted by an instruction buffer 201 and an instruction fetch unit control circuit 202.

The instruction buffer 201 is designed to store the prefetched instruction from the bus I/F unit 105, and outputs an instruction code in a 6-byte unit to an instruction code input register 210, to be described later, of the instruction decoding unit 107 as a signal 203.

The instruction fetch unit control circuit 202 controls the operation in the instruction fetch unit 106 such as input/output control of the instruction buffer 201, mainly by a control signal 204. Specifically, since the number of bytes of the instruction code which has been used or decoded is given to the instruction fetch unit control circuit 202 from an instruction decoding unit control circuit 222 to be described later as a signal 206, which byte of the instruction code held in the instruction buffer 201 is outputted to the instruction code input register 210 is decided.

The instruction fetch unit control circuit 202 gives the instruction fetch request to the bus I/F unit 105, or outputs a signal 205 indicating whether the instruction code outputted by the instruction buffer 201 is valid or invalid, to the instruction decoding unit 107.

The instruction decoding unit 107 consists mainly of the instruction code input register 210, a main decoder 211, a subdecoder 217, the instruction decoding unit control circuit 222, an AND gate 231 and registers 224 to 230. The instruction code input register 210 inputs the 6-byte instruction code outputted from the instruction buffer 201 in synchronism with the clock $\phi 1$, and outputs it after holding it temporarily. Specifically, the instruction code input register 210, among the 6-byte instruction code held therein, outputs a first byte to the main decoder 211 as a signal 232, a second byte to the subdecoder 217 as a signal 233 and third to sixth bytes to the extension part data register 230 as an extension part data signal 234. The extension part data signal 234 is held in the register 230 in synchronism with the clock $\phi 2$, and further, outputted from the register 230 and held in a register 245 of the instruction execution control unit 108 in synchronism with the clock $\phi 1$ in and after the second machine cycle. The main decoder 211, as described above, decodes the first byte or an operation code part in the 6-byte instruction code outputted from the instruction code input register 210, and outputs information related to instruction execution. Specifically, the main decoder 211 outputs the following signals.

Main microaddress signal

A main microaddress signal 212 is held in the register 224 in synchronism with the clock $\phi 2$. This signal indicates an address of the micro-ROM 109 which indicates a start address of a microprogram routine for instruction execution control.

The main microaddress signal 212 is outputted from the register 224 and inputted to a microaddress input selector 252 of the instruction execution control unit 108, and held in a register 240 in synchronism with the clock $\phi 1$ in and after the second machine cycle.

Operand fetch request signal

An operand fetch request signal 213 is held in the register 226 in synchronism with the clock $\phi 2$. This signal indicates that the operand is to be fetched when it is "1", and not to be fetched when it is "0".

The operand fetch request signal 213 is outputted from the register 226 and is held in a register 241 of the instruction execution control unit 108 in synchronism with the clock $\phi 1$ in and after the second machine cycle.

Subdecoder valid signal

A subdecoder valid signal 214 is outputted to the AND gate 231. This signal indicates that the decode result of the subdecoder 217 is valid when it is "1", and that the decode result of the subdecoder 217 is invalid when it is "0".

First register number signal

A first register number signal 215 is held in the register 228 in synchronism with the clock $\phi 2$. This signal is that a value of a register number field in the operation code is outputted intact.

The first register number signal 215 is outputted from the register 228, and is held in a register 243 of the instruction execution control unit 108 in synchronism with the clock $\phi 1$ in and after the second machine cycle.

Control signal

A control signal 216 is outputted to the instruction decoding unit control circuit 222. This signal is for controlling the instruction decoding unit 107.

The subdecoder 217, as described above, decodes the second byte or an operand designating part in the 6-byte instruction code outputted from the instruction code input register 210, and outputs information related to address calculation. Specifically, the subdecoder 217 outputs the following signals.

Sub-microaddress signal

A sub-microaddress signal 218 is held in the register 225 in synchronism with the clock $\phi 2$. This signal indicates the address of the micro-ROM 109 indicating a start address of the microprogram routine for address calculation.

The sub-microaddress signal 218 is outputted from the register 225 and is inputted to the microaddress input selector 252 of the instruction execution control unit 108.

Register/memory signal

A register/memory signal 219 is outputted to the AND gate 231. This signal indicates that an addressing mode is a general purpose register of a general purpose register file 308 when it is "0" and that the addressing mode is the memory 104 when it is "1".

Second register number signal

A second register number signal 220 is held in the register 229 in synchronism with the clock φ2. This signal is that, a value of the register number filed in the operand designating part is outputted intact.

The second register number signal 220 is outputted from the register 229 and is held in a register 244 of the instruction execution control unit 108 in synchronism with the clock φ1 in and after the second machine cycle.

Extension part size signal

An extension part size signal 221 is outputted to the instruction decoding unit control circuit 222. This signal indicates how many bytes is in the extension part.

The instruction decoding unit control circuit 222 controls the instruction decoding unit 107.

The instruction decoding unit control circuit 222 outputs size information of the instruction code used in the instruction decoding unit 107 to the instruction fetch unit 106 as the signal 206, and outputs the signal 235 indicating whether the signal such as the microprogram address and the like being outputted at present is valid or invalid, to the instruction execution control unit 108.

An output signal of the AND gate 231 is held in the register 227 as an address calculation request signal 223 in synchronism with the clock φ2. The address calculation request signal 223 is the signal which executes AND operation of the subdecoder valid signal 214 outputted from the main decoder 211 and the register/memory signal 219 outputted from the subdecoder 217, and indicates that the address calculation is necessary when it is "1", and that the address calculation is not necessary when it is "0".

The address calculation request signal 223 as the output of the AND gate 231 is outputted from the register 227 and inputted to an instruction execution control unit control circuit 256 of the instruction execution control unit 108, and is held in the register 242 in synchronism with the clock φ1 in and after the second machine cycle.

To the registers 224 to 230 in the instruction decoding unit 107, though not shown, an instruction execution finish signal 263 outputted by the instruction execution control unit control circuit 256 is given, and the inputted signals are respectivel held therein in synchronism with the clock φ2, only when the instruction execution finish signal 263 is valid.

The instruction execution control unit 108 consists mainly of the aforementioned micro-ROM 109, microaddress input selector 252, a microaddress input register 253, a micro-ROM output register 254, a microdecoder 255, instruction execution control unit control circuit 256, registers 240 to 245 and registers 246 to 251.

The registers 240 to 245 input signals in synchronism with the clock φ1.

Though not shown, the instruction execution finish signal 263 outputted by the instruction execution control unit control circuit 256 is given to the registers 246 to 251, and the signals which have been inputted are respectively held therein in synchronism with the clock φ2, only when the instruction execution finish signal 263 is valid.

The registers 240 to 245 and the registers 246 to 251 are connected as follows.

The output of the register 224 of the instruction decoding unit 107 or the main microaddress signal 212 is inputted to the register 240, and held therein in synchronism with the clock φ1. The output of the register 240 is inputted to the register 246 and held therein in synchronism with the clock φ2. Meanwhile, the output of the register 246 is inputted to the microaddress input selector 252.

The output of the register 224 of the instruction decoding unit 107 is also inputted directly to the microaddress input selector 252. Thus, the main microaddress signal 212 outputted from the main decoder 211 is held in the register 224 in synchronism with the clock 100 2 in the first machine cycle, and simultaneously, inputted to the microaddress input selector 252 and held in the register 246 in synchronism with the clock 100 2 in and after the second machine cycle, and simultaneously, again inputted to the microaddress input selector 252.

The output, of the register 226 of the instruction decoding unit 107 or the operand fetch request signal 213 inputted to the register 241, and held therein in synchronism with the clock φ1. The output of the register 241 is inputted to the register 247 and held therein in synchronism with the clock φ2. Meanwhile, the output of the register 247 is inputted to the instruction execution control unit control circuit 256.

The output of the register 227 of the instruction decoding unit 107 or the address calculation request signal 223 is inputted to the register 242 and held therein in synchronism with the clock φ1. The output of the register 242 is inputted to the register 248 and held therein in synchronism with the clock φ2. Meanwhile, the output of the register 248 is inputted to the instruction execution control unit control circuit 256 and the microdecoder 255.

The output of the register 227 of the instruction decoding unit 107 is also inputted directly to the instruction execution control unit control circuit 256. Thus, the address calculation request signal 223 outputted from the AND gate 231 is held in the register 227 in synchronism with the clock φ2 in the first machine cycle, and simultaneously, inputted to the instruction execution control unit control circuit 256, as well as held in the register 248 in synchronism with the clock 100 2 in and after the second machine cycle, and simultaneously, inputted again to the instruction execution control unit control circuit 256 and the microdecoder 255.

The output of the register 228 of the instruction decoding unit 107 or the first register number signal 215 is inputted to the register 243, and held therein in synchronism with the clock φ1. An output of the register 243 is inputted to the register 249 and held therein in synchronism with the clock φ2. Meanwhile, an output of the register 249 is inputted to the microdecoder 255.

The output of the register 229 of the instruction decoding unit 107 or the second register number signal 220 is inputted to the register 244 and held therein in synchronism with the clock φ1. The output of the register 244 is inputted to the register 250 and held therein in synchronism with the clock φ2. Meanwhile, an output of the register 250 is inputted to the microdecoder 255.

The output of the register 230 of the instruction decoding unit 107 or the extension part data signal 234 is inputted to the register 245 and held therein in synchronism with the clock φ1. The output of the register 245 is inputted to the register 251 and held therein in synchronism with the clock φ2. Meanwhile, the output of the register 251 is outputted to the instruction execution unit 110.

The microaddress input selector 252 is controlled by a selector control signal 260 outputted from the instruction execution control unit control circuit 256, and selects a microprogram address to be held in the microaddress input register 253 from either of the following signals.

The main microaddress signal 212 held in the register 224 of the instruction decoding unit 107.

The main microaddress signal 212 held in the register 246 of the instruction execution control unit 108. However, the main microaddress signal 212 held in the register 246 is delayed one machine cycle or more as compared with the above-mentioned main microaddress signal 212 held in the register 224 of the instruction decoding unit 107.

The sub-microaddress signal 218 held in the register 225 of the instruction decoding unit 107.

A next microaddress signal 262 specified by a microinstruction held in the micro-ROM output register 254 of the instruction execution control unit 108.

Though the operation of the microaddress input selector 252, or which signal is to be held in the microaddress input register 252 in which case, is shown in a table of FIG. 4, the detail is to be described later.

The microaddress input register 253 holds a value of the signal selected and outputted by the microaddress input selector 252 or a value of the microprogram address in synchronism with the clock φ1, and accesses the micro-ROM 109 by the value.

The micro-ROM output register 254 inputs the microinstruction read from the micro-ROM 109 in synchronism with the clock φ2. In the instruction, a field designating the microprogram sequence operation is outputted to the instruction execution control unit control circuit 256 as a microsequence control signal 261, and a field designating an address of a microprogram to be executed next is outputted as the next microaddress signal 262 and is inputted to the microaddress input selector 252. The rest of the fields are outputted to the microdecoder 255.

The microdecoder 255 inputs and decodes a part of microinstruction outputted from the micro-ROM output register 254, address calculation request signal 223 (from the AND gate 231 via the registers 227, 242 and 248), first register number signal 215 (via the registers 228, 243 and 249) and second register number signal 220 (via the registers 229, 244 and 250) to generate a control signal which controls the instruction execution unit 110.

The instruction execution control unit control circuit 256 controls the instruction execution control unit 108.

That is, the instruction execution control unit control circuit, 256 inputs the operation code for controlling microprogram sequence of the microinstruction, from the micro-ROM output register 254 as the microsequence control signal 261 to control the microaddress input selector 252, or outputs the instruction execution finish signal 263 to control the timing of holding signals respectively inputted to the instruction execution control unit 108 and the instruction decoding unit 107, by a part of registers of the instruction execution control unit 108 and the instruction decoding unit 107.

Specifically, the registers 224 to 230 in the instruction decoding unit 107 respectively hold the signals which have been inputted in synchronism with the clock 100 2 only when the instruction execution finish signal 263 outputted by the instruction execution control unit control circuit 256 is valid. The registers 246 to 251 in the instruction execution control unit 108 respectively hold the signals which have been inputted in synchronism with the clock φ2 only when the instruction execution finish signal 263 outputted by the instruction execution control unit control circuit 256 is valid.

Thus, the registers 224 to 230 in the instruction decoding unit 107 and the registers 246 to 251 in the instruction execution control unit 108 never hold nor output a new signal, until the instruction execution finish signal 263 outputted by the instruction execution control unit control circuit 256 becomes valid.

The instruction execution control unit control circuit 256 outputs a signal indicating whether the control signal being outputted at present is valid or invalid, and inputs information necessary for instruction execution control from the instruction execution unit 110.

Figure 5:
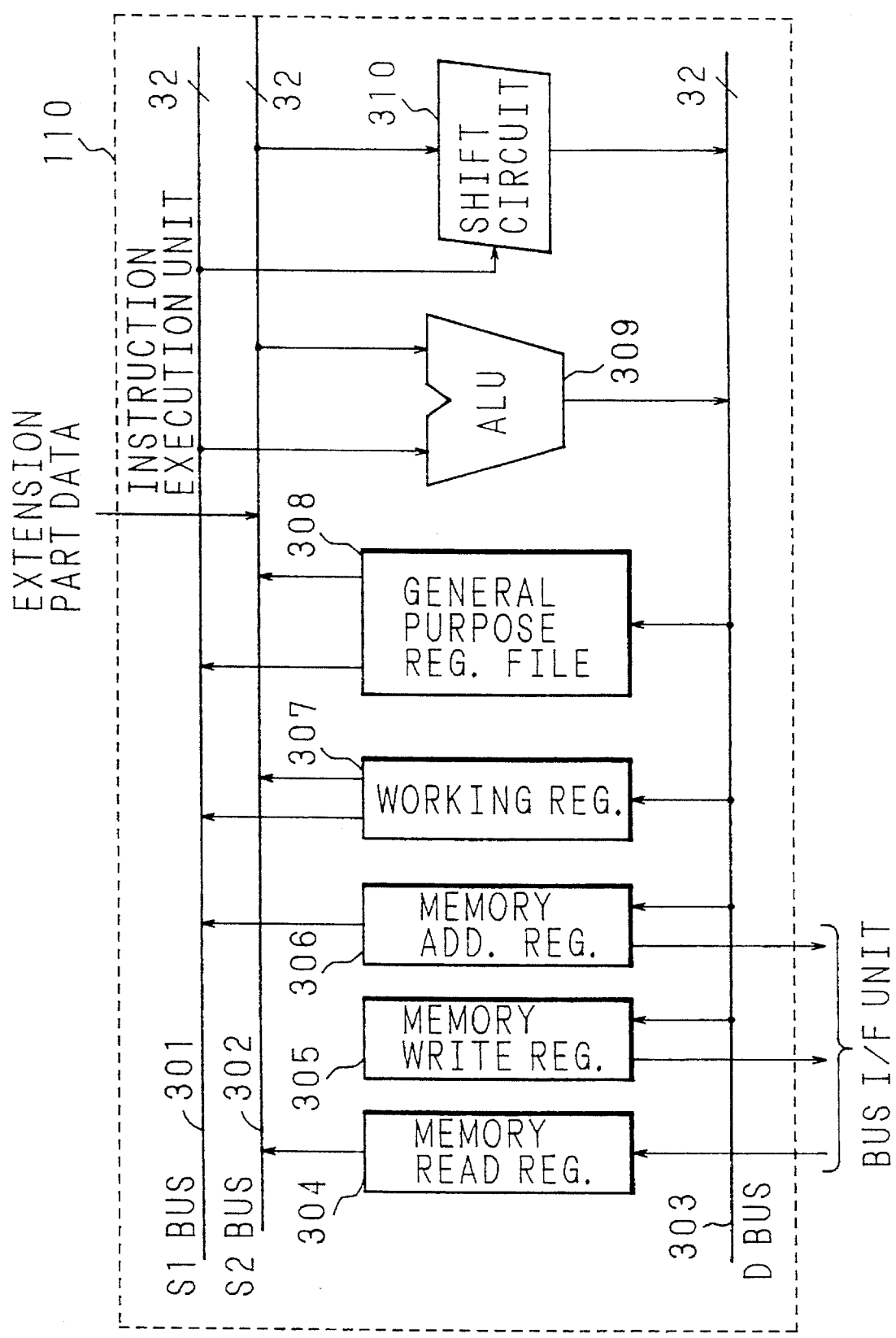
FIG. 5 is a block diagram showing a detailed configuration of an instruction execution unit of a data processor of the present invention.

FIG. 5 is a block diagram showing a detailed configuration of the instruction execution unit 110 shown in FIG. 1.

In FIG. 5, numeral 301 designates an S1 bus (32 bits), numeral 302 designates an S2 bus (32 bits) and numeral 303 designates a D bus (32 bits), which are used for data operation.

Numeral 304 designates a memory read register (32 bits) which holds data read from the memory 104. The memory read register 304 includes an input path from the bus I/F unit 105 and an output path to the S2 bus 302.

Numeral 305 designates a memory write register (32 bits) which holds data to be written into the memory 104. The memory write register 305 includes an input path from the D bus 303 and an output path to the bus I/F unit 105.

Numeral 306 designates a memory address register (32 bits), which stores the memory address. The memory address register 306 includes an input path from the D bus 303 and output paths to the S1 bus 301 and the bus I/F unit 105.

Numeral 307 designates a working register (32 bits) which includes an input path from the D bus 303 and output paths to the S1 bus 301 and S2 bus 302.

Numeral 308 designates a general purpose register file (32 bits ×16), which is constituted by 16×32-bit general purpose registers R0 to R15. The general purpose registers R0 to R15 respectively include an input path from the D bus 303 and output paths to the S1 bus 301 and S2 bus 302.

Numeral 309 designates an ALU, which inputs data from the S1 bus 301 and S2 bus 302 for addition, subtraction and logical operation. The operation result by the ALU 309 is outputted to the D bus 303. The ALU 309 also includes a function to output data inputted from the S1 bus 301 and S2 bus 302 to the D bus 303 intact.

Numeral 310 designates a shift circuit which includes input paths from the S1 bus 301 and S2 bus 302 and an output path to the D bus 303, and shifts the data inputted from the S2 bus 302 rightwardly or leftwardly by bits designated by the data inputted from the S1 bus 301. Shift result data by the shift circuit 310 is outputted to the D bus 303.

Though respective constituents of the instruction execution unit 110 shown in FIG. 5 are controlled by a signal outputted from the microdecoder 255 of the instruction execution control unit 108, signal lines for that purpose are omitted in FIG. 5.

FIG. 4 is a table showing an operation state of the microaddress input selector 252 shown in FIG. 2, in other words, a control state of the microaddress input selector 252 by the selector control signal 260 outputted from the instruction execution control unit control circuit 256.

In the left column of the table shown in FIG. 4, operations of the microprogram routine, or the operations specified by the microsequence control signal 261 inputted to the instruction execution control unit control circuit 256 from the micro-ROM output register 254 are shown, and in the right column, signals selected by the microaddress input selector 252 corresponding to the respective operations, or microprogram address values are shown.

Specifically, when operation "exit" indicating operation finish of the microprogram routine is specified by the microsequence control signal 261, the instruction execution control unit control circuit 256 allows the microaddress input selector 252 to select the main microaddress signal 212 held in the register 224 of the instruction decoding unit 107 when the address calculation request signal 223 is "0", and to select the sub-microaddress signal 218 held in the register 225 when the address calculation request signal 223 is "1".

When the operation "exit" is specified by the microsequence control signal 261, the instruction execution control unit control circuit 256 outputs the instruction execution finish signal 263, as previously described. By receiving the instruction execution finish signal 263, the registers 224 to 230 and 246 to 251 hold the signals which have been inputted in synchronism with the clock φ2.

When operation "return" indicating address calculation finish is specified by the microsequence control signal 261, the instruction execution control unit control circuit 256 allows the microaddress input selector 252 to select the main microaddress signal 212 held in the register 246 of the instruction execution control unit 108.

When operation "goto" indicating a microjump is specified as the microsequence control signal 261, the instruction execution control unit control circuit 256 allows the microaddress input selector 252 to select the next microaddress signal 262 outputted from the micro-ROM output register 254.

When operation "go/ex" indicating the operation "goto" or "exit" is specified as the microsequence control signal 61, the instruction execution control unit control circuit 56 allows the microaddress input selector 252 to select in the same way as the case of "exit" when the address calculation request signal is "0" and to select in the same way as the case of "goto" when the address calculation request signal 223 is "1".

When operation "go/ret" indicating the operation "goto" or "return" is specified as the microsequence control signal 261, the instruction execution control unit control circuit 256 allows the microaddress input selector 252 to select in the same way as the case of "return" when the operand fetch request signal 213 is "0" and to select in the same way as the case of "goto" when the operand fetch request signal 213 is "1".

Figure 6:
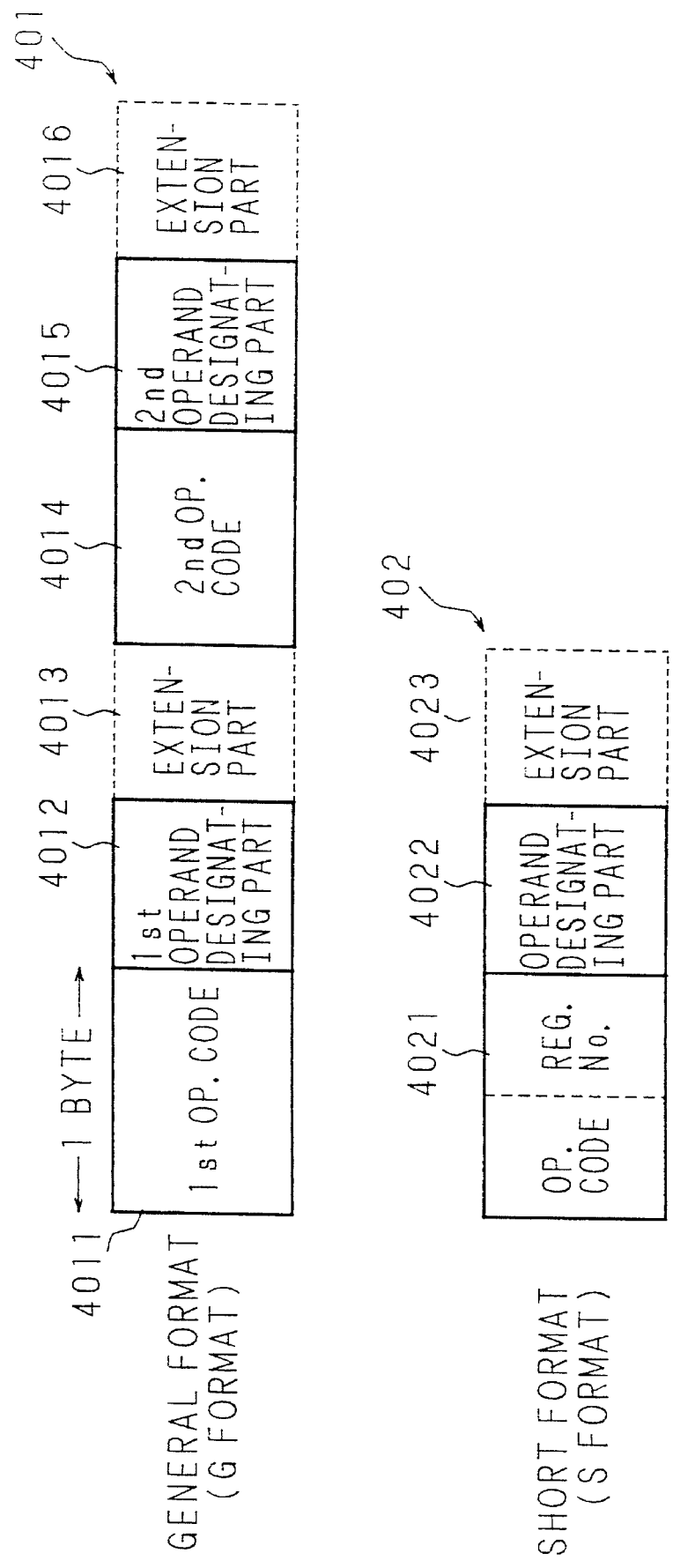
FIG. 6 is a schematic view showing an example of instruction format processed by a data processor of the present invention.

FIG. 6 is a schematic view showing an example of format of instructions processed by the processor 103 of the data processor of the present invention.

In FIG. 6, numeral 401 designates a general instruction format (G format) which consists of 1-byte operation codes 4011, 4014, and 1-byte operand designating parts 4012, 4015.

Sometimes extension parts 4013, 4016 are attached after the operand designating parts 4012, 4015.

Numeral 402 designates a short instruct ion format (S format) for a part of instruction which is used frequently, wherein register numbers are included in an operation code 4021, and the 2-operand instruction can be expressed by the operation code 4021 and the size of a 2-bytes +extension part 4023 of an operand designating part 4022. However, in the S format, one operand always serves as the register.

FIG. 7 is a schematic view showing formats of addressing modes which can be designated by the operand designating parts 4012, 4015 and 4022 of the formats shown in FIG. 6.

In FIG. 7, numeral 411 designates the format of a register direct addressing mode, numeral 412 designates the format of a register indirect addressing mode, numeral 413 designates the format of a 32-bit register relative indirect addressing mode and numeral 415 designates the format of a 32-bit absolute addressing mode.

An operand designating part is a field designating the register direct mode and register indirect addressing mode, and a part of which designates the register number (Rn) in the addressing modes (register indirect, register relative indirect) using a register value in the register direct addressing address calculation.

In the absolute addressing mode or the register relative indirect addressing mode, an absolute address or relative value is designated as a 16-bit or 32-bit extension part.

FIG. 8 is a schematic view showing an example of instruction code of MOV instructions (data transfer instruction).

An instruction code 421 shown in FIG. 8A is an example of register to register transfer of general type (G format), wherein a general purpose register R0 in a register direct mode is designated as a first operand, and a general purpose register R1 in the register direct mode is designated as a second operand.

Thus, the instruction code 421 is designed to transfer a value of the general purpose register R0 to the general purpose register R1.

An instruction code 422 shown in FIG. 8B is an example of memory to memory transfer of general type (G format), wherein a value of a memory whose address is a value of a general purpose register R2 in a register indirect mode is designated as the first operand, and a memory address "12345678(hexadecimal)" by the extension part in an absolute mode is designated as the second operand.

Thus, the instruction code 422 is designed to transfer the value of the memory, whose address is the value of the general purpose register R2, to the memory address "12345678 (hexadecimal)".

An instruction code 423 shown in FIG. 8C is an example of register to register transfer of short type (S format), wherein a register R3 is designated as the first operand and a general purpose register R4 in a register direct mode is designated as the second operand.

Thus, the instruction code 423 is designed to transfer a value of the general purpose register R3 to the general purpose register R4.

An instruction code 424 shown in FIG. 8D is an example of memory to memory transfer of short type (S format), wherein a general purpose register R5 is designated as the first operand, and a value obtained by adding a value "00001000 (hexadecimal)" of the extension part to a value of a general purpose register R6 in a register relative mode is designated as the second operand.

Thus, the instruction code 424 is designed to transfer a value of the general purpose register R5 to a memory whose address is a value obtained by adding "00001000 (hexadecimal)" to the value of the general purpose register R6.

FIG. 9 is a table of output signals in the instruction decoding unit 107 in case of executing the instructions shown in FIG. 8.

In FIG. 9, a symbol "X" indicates that an output of the signal is meaningless (don't care).

For example, when the first operand of the general type of register to register transfer (G format) instruction code 421 shown in FIG. 8A is decoded, a signal outputted as the main microaddress signal 212 is a start address in the micro-ROM 109 of a microprogram routine "movg1", a signal outputted as the sub-microaddress signal 218 is meaningless, a signal outputted as the operand fetch request signal 213 is "1", a signal outputted as the subdecoder valid signal 214 is "1", a signal outputted as the register/memory signal 219 is "0", a signal outputted as the first register number signal 215 is meaningless, a signal outputted as the second register number signal 220 indicates the general purpose register R0 and a signal outputted as the extension part data signal 234 is meaningless.

The operation of the data processor of the present invention constituted as above is described taking the MOV instruction execution sequence as an example.

The MOV instruction is designed to transfer data to a destination from a source, and designates the source in the first operand and the destination in the second operand.

Figure 10:
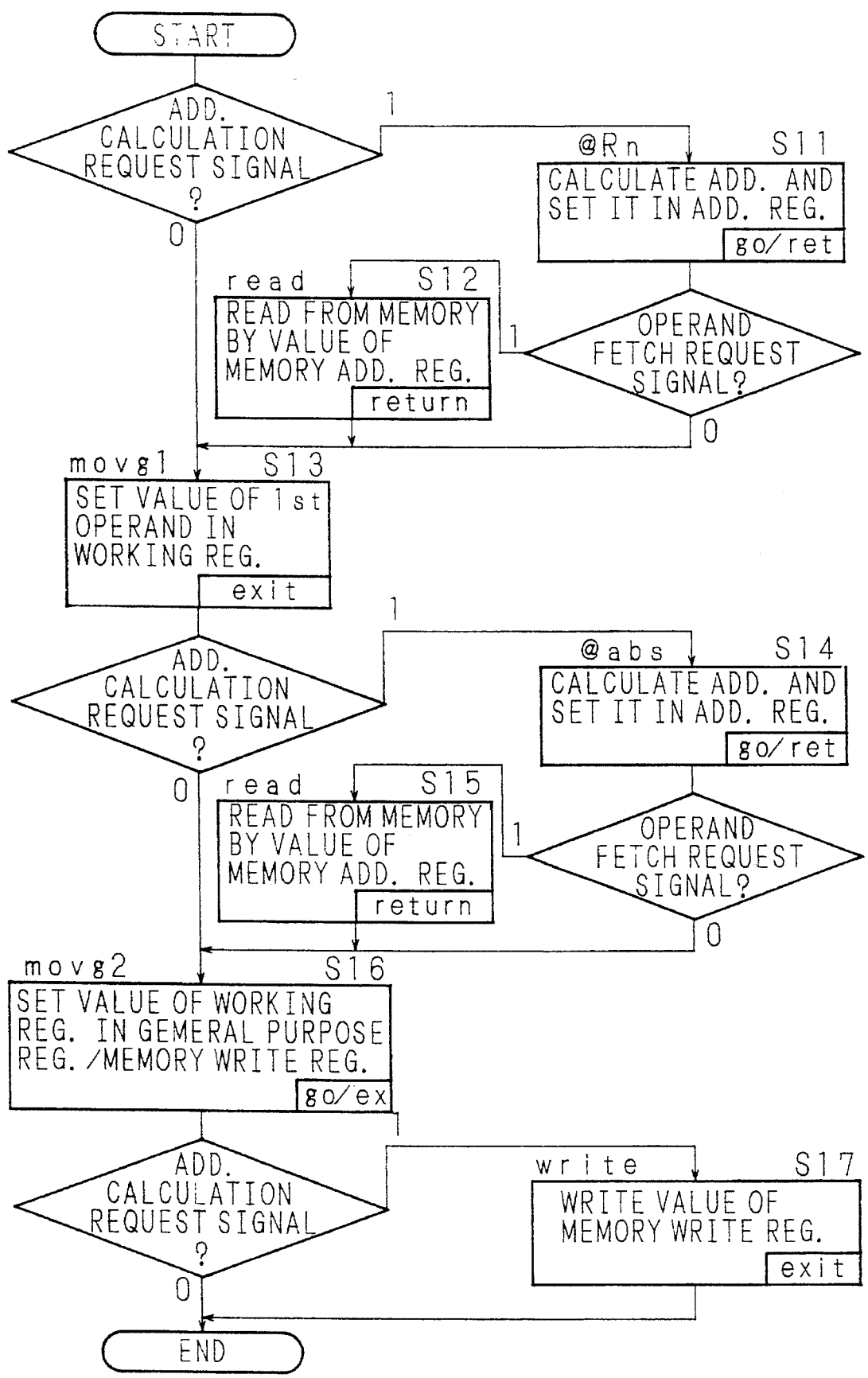
FIG. 10 is a flowchart showing an execution sequence of a general format of a MOV instruction (data transfer instruction) processed by a data processor of the present invention.

FIG. 10 is a flowchart showing the general (G format) microprogram execution sequence of the MOV instruction (data transfer instruction).

Figure 11:
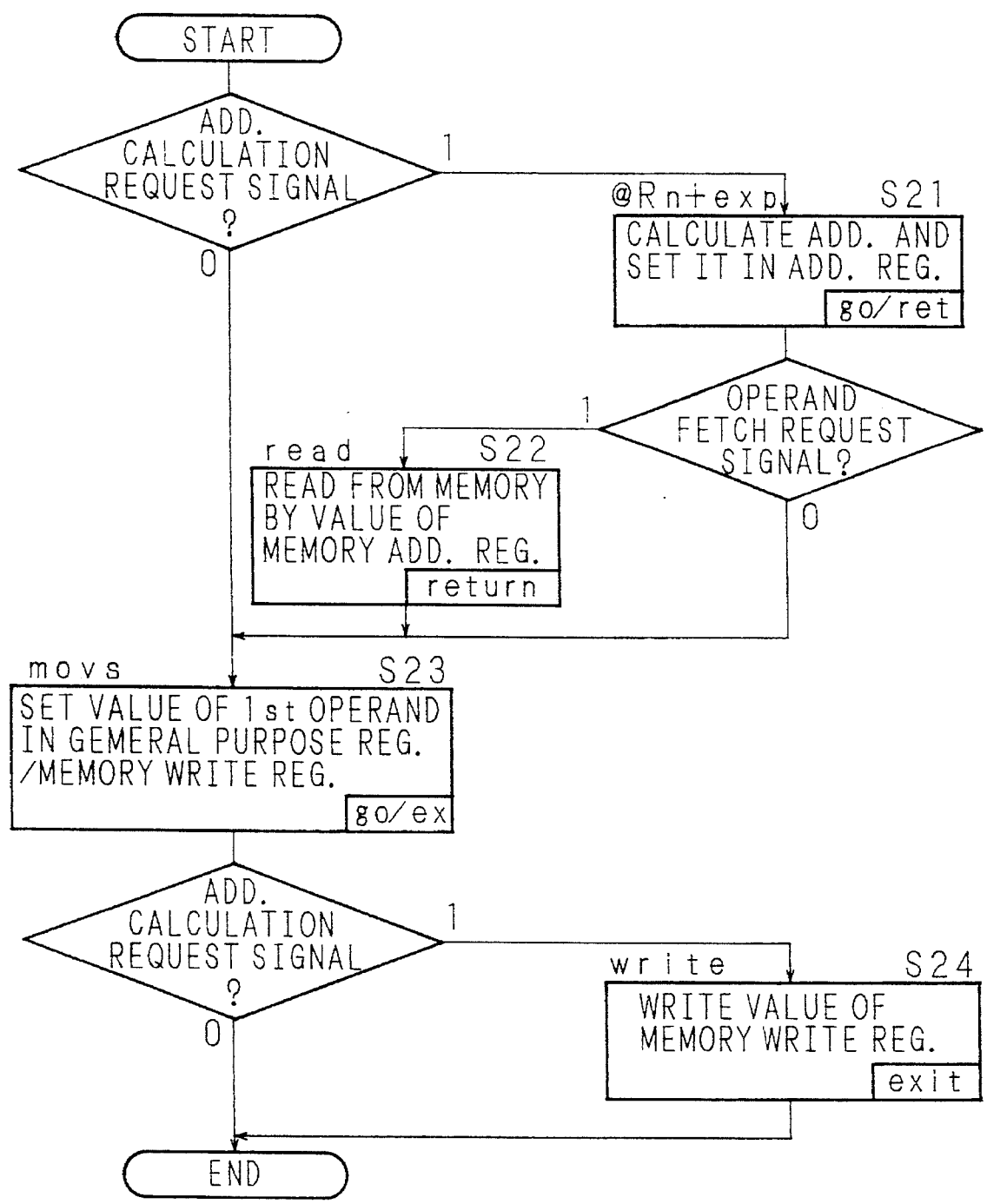
FIG. 11 is a flowchart showing an execution sequence of a short format of a MOV instruction (data transfer instruction) processed by a data processor of the present invention.

FIG. 11 is a flowchart showing the short (S format) microprogram execution sequence of the MOV instruction (data transfer instruction).

(A) Register to register transfer of general type (refer to FIG. 10)

At first, the general instruction execution sequence in case of designating the register direct addressing mode in both the first operand and the second operand is described.

The instruction code 421 shown in FIG. 8A, specifically, writes a value of the general purpose register R0 of the general purpose register file 308 into the general purpose register R1.

First 2 bytes of the instruction code are decoded at fist.

Specifically, the instruction code 421 shown in FIG. 8A is held temporarily in the instruction code input register 210 in synchronism with the clock φ1 in the first machine cycle, and the 1 byte at the top is decoded by the main decoder 211 and the next 1 byte by the subdecoder 217.

Decode results are as shown in a column (A) of the first operand of FIG. 9.

Signals outputted from the main decoder 211 are as follows.

As the main microaddress signal 212, the start address of the microprogram routine "movg1" is outputted.

As the operand fetch request signal 213, "1" indicating that the operand is to be fetched is outputted.

As the subdecoder valid signal 214, "1" indicating that the decode result of the subdecoder 217 is valid is outputted and is inputted to the AND gate 231.

As the first register number signal 215, "X (don't care)" is outputted.

Signals outputted from the subdecoder 217 are as follows.

As the sub-microaddress signal 218, "X (don't care)" is outputted.

As the register/memory signal 219, "0" indicating that the addressing mode is the register is outputted and inputted to the AND gate 231.

As the second register number signal 220, a signal indicating the general purpose register R0 is outputted.

Since "1" is outputted as the subdecoder valid signal 214, and "0" is outputted as the register/memory signal 219, "0" indicating that address calculation is not necessary is outputted as the address calculation request signal 223 from the AND gate 231.

As shown in FIG. 8A, since the first operand of the instruction code 421 does not include the extension part, "X (don't care)" is outputted from the instruction code input register 210 as the extension part data signal 234.

Now, when the last microinstruction of the previous instruction is read from the micro-ROM 109, "exit" is designated to the instruction execution control unit control circuit 256 as the microsequence operation by the microsequence control signal 261. Thereby, the instruction execution finish signal 263 is outputted from the instruction execution control unit control circuit 256, and the above-mentioned signals are held in the registers 224 to 230 in synchronism with the clock φ2, and inputted to the registers 204 to 245, microaddress input selector 252 and instruction execution finish signal 263.

At this time, since the address calculation request signal 233 is "0", as is shown in FIG. 4, the instruction execution control unit control circuit 256 controls the microaddress input selector 252 to elect the main microaddress signal 212 held in the register 224 of the instruction decoding unit 107.

Thus, in the microaddress input register 253, the start address of themicroprogram routine "movg1" is held as the address of the micro-ROM 109, in synchronism with the clock φ1 in the second machine cycle.

The microprogram routine "mov1" is read from the micro-ROM 109 according to the address held in the microaddress input register 253, and is held in the micro-ROM output register 254 is synchronism with the clock φ2 in the second machine cycle, and is decoded by the microdecoder 255 for processing.

The above operation corresponds to "START"→Step 13 in the flowchart show in FIG. 10.

The "movg1" routine saves the first operand value (here, the general purpose register RO of the general purpose register file 308 is designated) once in the working register 307.

Specifically, the value of the general purpose register R0 of the general purpose register file 308 is transferred to and stored in the working register 307 via the S1 bus 301, ALU 309 and D bus 303.

Since the processings corresponding to the first operation code of the MOV instruction is finished, the microsequence operation "exit" is designated to the instruction execution control unit control circuit 256 from the micro-ROM output register 254 by the microsequence control signal 261.

While, in the instruction decoding unit 107, when the first 2 bytes of the instruction code have been decoded, subsequently, the next 2 bytes are decoded.

Specifically, third and fourth bytes of the instruction code 421 shown in FIG. 8A are held temporarily in the instruction code input register 210 in synchronism with the clock φ1 in the second machine cycle, the third byte is decoded in the main decoder 211 and the fourth byte is decoded in the subdecoder 217.

Decode results are as shown in a column (A) of the second operand of FIG. 9.

Signals outputted from the main decoder 211 are as follows.

As the main microaddress signal 212, the start address of a microprogram routine "movg2" is outputted.

As the operand fetch request signal 213, "0" indicating that the operand is not to be fetched is outputted.

As the subdecoder valid signal 214, "1" indicating that the decode result of the subdecoder 217 is valid is outputted and inputted to the AND gate 231.

As the first register number signal 215, "X (don't care)" is outputted.

Signals outputted from the subdecoder 217 are as follows.

As the sub-microaddress signal 218, "X (don't care)" is outputted.

As the register/memory signal 219, "0" indicating that the addressing mode is the register is outputted and inputted to the AND gate 231.

As the second register number signal 220, a signal indicating the general purpose register R1 is outputted.

Since "1" is outputted as the subdecoder valid signal 214, and "0" is outputted as the register/memory signal 219, "0" indicating that the address calculation is not necessary is outputted as the address calculation request signal 223 from the AND gate 231.

As shown in FIG. 8A, since the second operand of the instruction code 421 also does not include the extension part, "X (don't care)" is outputted from the instruction code input register 210 as the extension part data signal 234.

Now, at the time point of finish of the processing corresponding to the first operation code, the microsequence operation "exit" of the "movg1" routine is designated to the instruction execution control unit control circuit 256 from the micro-ROM output register 254, by the microsequence control signal 261. Thereby, the instruction execution finish signal 263 is outputted from the instruction execution control unit control circuit 256, and the above-mentioned signals are held in the registers 224 to 230 in synchronism with the clock φ2, and inputted to the registers 204 to 245, microaddress input selector 252 and instruction execution finish signal 263.

At this time, since the address calculation request signal 223 is "0", as shown in FIG. 4, the instruction execution control unit control circuit 256 controls the microaddress input selector 252 to select the main microaddress signal 212 held in the register 224 of the instruction decoding unit 107.

Thus, in the microaddress input register 253, the start address of the microprogram routine "movg2" is held as the address of the micro-ROM 109, in synchronism with the clock φ1 in the next machine cycle.

The microprogram routine "movg2" is read from the micro-ROM 109 according to the address held in the microaddress input register 253, and held in the micro-ROM output register 254 in synchronism with the clock φ2, and is decoded by the microdecoder 255 for processing.

The above operation corresponds to Step S13 →Step S16 in the flowchart shown in FIG. 10.

The "movg2" routine transfers a value of the first operand saved in the working register 307 by the "movg1" routine to the second operand (here, the general purpose register R1 of the general purpose register file 308 is designated).

Specifically, a value of the working register 307 is transferred to and stored in the general purpose register R1 of the general purpose register file 308 designated as the second operand and in the memory write register 305 via the S1 bus 301, ALU 309 and D bus 303.

Though the microsequence control signal 261 designating the next microsequence operation becomes "go/ex", since the address calculation request signal 223 (output of the instruction execution control unit 108) is "0", as shown in FIG. 4, the instruction execution control unit control circuit 256 controls the microaddress input selector 252 in the same way as the case of "exit" to finish the instruction processing.

In such a manner, by the instruction code 421 shown in FIG. 8A, the value of the general purpose register R0 of the general purpose register file 308 is transferred to the general purpose register R1.

In the flowchart shown in FIG. 10, the instruction is executed in two steps, "START" →Step S13 →Step S16 → "END".

(B) Memory to memory transfer of general type (refer to FIG. 10)

The general instruction execution sequence, in which the register indirect addressing mode is designated by the first operand and the absolute addressing mode is designated by the second operand is described.

The instruction code 422 shown in FIG. 8B, specifically, writes a value of the memory 104, whose address is the value of the general purpose register R2 of the general purpose register file 308, into the address "12345678 (hexadecimal)".

First 2 bytes of the instruction code are decoded at first.

Specifically, the instruction code 422 shown in FIG. 8A is held temporarily in the instruction code input register 210 in synchronism with the clock φ1 in the first machine cycle, and the 1 byte at the top is decoded in the main decoder 211 and the next 1 byte is decoded in the subdecoder 21.

Decode results are as shown in a column (B) of the first operand of FIG. 9.

Signals outputted from the main decoder 211 are as follows.

As the main microaddress signal 212, the start address of the microprogram routine "movg1" is outputted.

As the operand fetch request signal 213, "1" indicating that the operand is to be fetched is outputted.

As the subdecoder valid signal 214, "1" indicating that the decode result of the subdecoder 217 is valid is outputted and inputted to the AND gate 231.

As the first register number signal 215, "X (don't care)" is outputted.

Signals outputted from the subdecoder 217 are as follows.

As the sub-microaddress signal 218, "@Rn" is outputted.

As the register/memory signal 219, "1" indicating that the addressing mode is the memory 104 is outputted and inputted to the AND gate 231.

As the second register number signal 220, a signal indicating the general purpose register R2 is outputted.

Since "1" is outputted as the subdecoder valid signal 214 and "1" is outputted as the register/memory signal 219 respectively, from the AND gate 231, "1" indicating that the address calculation is necessary is outputted as the address calculation request signal 223.

As shown in FIG. 8B, since the first operand of the instruction code 422 does not include an extension part, "X (don't care)" is outputted from the instruction code input register 210 as the extension part data signal 234.

Now, when the last microinstruction of the previous instruction is read from the micro-ROM 109, the microsequence operation "exit" is designated to the instruction execution control unit control circuit 256 by the microsequence control signal 261. Thereby, the aforementioned signals are respectively held in the registers 224 to 230 in synchronism with the clock φ2, and respectively inputted to the registers 204 to 245, microaddress input selector 252 and instruction execution finish signal 263.

At this time, since the address calculation request signal 223 is "1", as shown in FIG. 4, the instruction execution control unit control circuit 256 controls the microaddress input selector 252 to select the sub-microaddress signal 218 held in the register 225 of the instruction decoding unit 107.

Thus, in the microaddress input register 253, the start address of the microprogram routine "@Rn" is held in synchronism with the clock φ1 in the second machine cycle as the address of the micro-ROM 109.

While, the main microaddress signal 212 indicating the start address of the microprogram routine "movg1" outputted from the instruction decoding unit 107, is held in the register 240 of the instruction execution control unit 108 in synchronism with the clock φ1 in the second machine cycle, and further, is held in the register 246 of the instruction execution control unit 108 in synchronism with the clock φ2 in the second machine cycle.

The "@Rn" routine is read from the micro-ROM 109 according to the address held in the microaddress input register 253, and held in the micro-ROM output register 254 in synchronism with the clock φ2 and decoded by the microdecoder 255 for processing.

The above operation corresponds to "START"→Step S11 in the flowchart shown in FIG. 10.

The "@Rn" routine is the microprogram routine for register indirect address calculation.

A value of the general purpose register designated by the first operand designating part (here, the general purpose register R2 of the general purpose register file 308 is designated) is transferred to and stored in the memory address register 306 via the S1 bus 301, ALU 309 and D bus 303.

Though the microsequence control signal 261 designating the next microsequence operation becomes "go/set", since the operand fetch request signal 213 is "1", as shown in FIG. 4, the instruction execution control unit control circuit 256 controls the microaddress input selector 252 in the same way as the case of microsequence operation "goto".

As a jump destination of the microsequence operation "goto", an address of a routine "read" for memory read is designated by the next microaddress signal 262. In the routine "read", the memory 104 is read with a value of the memory address register 306 as the address. Data which has been read is set in the memory read register 304.

The above operation corresponds to Step S11 →Step S12 in the flowchart shown in FIG. 10.

Since the microsequence control signal 261 designating the next microsequence operation becomes "return", as shown in FIG. 4, the instruction execution control unit control circuit 256 controls the microaddress input selector 252 to select the main microaddress signal 212 held in the register 246 of the instruction execution control unit 108.

Thereby, as the next microprogram address, a start address of the "movg1" is designated.

In the "movg1" routine, in the same way as aforementioned, the value of the first operand (here, the memory read register 304 is designated) is stored in the working register 307 via the S1 bus 301 →ALU309 →D bus 303.

The above operation corresponds to Step S12 →Step S13 in the flowchart shown in FIG. 10.

While, in the instruction decoding unit 107, when first 2 bytes of the instruction code have been decoded, subsequently, the next 2 bytes are decoded.

Specifically, the instruction code 422 shown in FIG. 8B is held temporarily in the instruction code input register 210 in synchronism with the clock φ1 in the second machine cycle, the third byte is decoded in the main decoder 211 and the fourth byte is decoded in the subdecoder 217.

Decode results are as shown in a column (B) of the second operand of FIG. 9.

Signals outputted from the main decoder 211 are as follows.

As the main microaddress signal 212, the start address of the microprogram routine "movg2" is outputted.

As the operand fetch request signal 213, "0" indicating that the operand is not to be fetched is outputted.

As the subdecoder valid signal 214, "1" indicating that the decode result of the subdecoder 217 is valid is outputted and is inputted to tile AND gate 231.

As the first register number signal 215, "X (don't care)" is outputted.

Signals outputted from the subdecoder 217 are as follows.

As the submicroaddress signal 218, "@abs" is outputted.

As the register/memory signal 219, "1" indicating that an addressing mode is the memory 104 is outputted, and is inputted to the AND gate 231.

As the second register number signal 220, "X (don't care)" is outputted.

Since "1" is outputted as the subdecoder valid signal 214 and as the register/memory signal 219 respectively, "0" indicating that the address calculation is necessary is outputted from the AND gate 231 as the address calculation request signal 223.

As shown in FIG. 8B, since the second operand of the instruction code 422 includes an extension part, "12345678 (hexadecimal)" is outputted from the instruction code input register 210 as the extension part data signal 234.

Now, at the time point of finish of the processing corresponding to the first operation code, the microsequence operation "exit" of the "movg1" routine is designated to the instruction execution control unit control circuit 256 from the micro-ROM output register 254, by the microsequence control signal 261. Thereby, the above-mentioned signals are respectively held in the registers 224 to 230 in synchronism with the clock φ2, and are inputted to the registers 204 to 245, microaddress input selector 252 and instruction execution finish signal 263.

Also, at this time, since the address calculation request signal 223 is "1", as is shown in FIG. 4, the instruction execution control unit control circuit 256 controls the microaddress input selector 252 to select the sub-microaddress signal 218 held in the register 225 of the instruction decoding unit 107.

Thus, in the microaddress input register 253, the start address of the microprogram routine "@abs" is held in synchronism with the clock φ1 in the next machine cycle as the address of the micro-ROM 109.

While, the main microaddress signal 212 indicating the start address of the microprogram routine "movg2" outputted from the instruction decoding unit 107 is held in the register 240 of the instruction execution control unit 108, in synchronism with the clock φ1 in the next machine cycle, and further, held in the register 246 of the instruction execution control unit 108 in synchronism with the clock φ2.

The "@abs" routine is read from the micro-ROM 109 according to the address held in the microaddress input register 253, and held in the micro-ROM output register 254 in synchronism with the clock φ2, and decoded by the microdecoder 255 for processing.

The above operation corresponds to Step S13 →Step S14 in the flowchart shown in FIG. 10.

The "@abs" routine is a microprogram routine which performs the address calculation of absolute addressing.

The value of the extension part is transferred to and set in the memory address register 306 via the S1 bus 301, ALU 309 and D bus 303.

Though the microsequence control signal 261 designating the next microsequence operation becomes "go/set", since the operand fetch request signal 213 is "0", as shown in FIG. 4, the instruction execution control unit control circuit 256 controls the microaddress input selector 262 in the same way as the case of microsequence operation "return".

That is, the next microprogram address becomes the main microaddress signal 212 held in the register 246 of the instruction execution control unit 108, and the start address of the microprogram routine "movg2" is designated.

The above operation corresponds to Step S14 →Step S16 in the flowchart shown in FIG. 10.

In the "movg2" routine, in the same way as aforementioned, the value of the working register 307 is transferred to and stored in a register designated by a register number of the second operand designating part (since it is not designated here, it is not written into any general resistor), and a memory write register 305 via the S1 bus 301, ALU 309 and D bus 303.

Though the microsequence control signal 261 indicating the next microsequence operation becomes "go/ex" since the address calculation request signal 223 is "1", as shown in FIG. 4, the instruction execution control unit control circuit 256 controls the microaddress input selector 252 in the same way as the case of microsequence operation "goto".

As a jump destination of the microsequence operation "goto", an address of the routine "write" for memory write is designated by the next microaddress signal 262. In the routine "write" the value of the memory write register 305 is written into the memory 104 with the value of the memory address register 306 as the address.

The above operation corresponds to Step S16 →Step S17 in the flowchart shown in FIG. 10.

Then, the microsequence operation becomes "exit" and the instruction processing is finished.

In such a manner, by the instruction code 422 shown in FIG. 8B, memory data, whose address is the value of the general purpose register R2 of the general purpose register file 308, is written into the address "12345678 (hexadecimal)".

In the flowchart shown in FIG. 10, the instruction is executed in six steps, "START"→Step S11 →Step S12 → Step S13 →Step S14 →Step S16 →Step S17 →"END".

Though the operation "read" shown in FIG. 10 as Step S15 is necessary in case of reading the second operand from the memory, it is not necessary in the example shown herein.

(C) Register to register transfer of short type (refer to FIG. 11)

The short instruction execution sequence, in which a register direct addressing mode is designated by the second operand, is described.

The instruction code 423 shown in FIG. 8C, specifically, writes a value of the general purpose register R4 of the general purpose register file 308 into the general purpose register R5.

First 2 bytes of the instruction code is decoded in the same way as the aforementioned instruction at first.

Decode results are as shown in a column (C) of FIG. 9.

Signals outputted from the main decoder 211 are as follows.

As the main microaddress signal 212, the start address of a microprogram routine "movs" is outputted.

As the operand fetch request signal 213, "0" indicating that the operand is not to be fetched is outputted.

As the subdecoder valid signal 214, "1" indicating that the decode result of the subdecoder 217 is valid is outputted and inputted to the AND gate 231.

As the first register number signal 215, a signal indicating the general purpose register R3 is outputted.

Signals outputted from the subdecoder 217 are as follows.

As the sub-microaddress signal 218, "x (don't care)" is outputted.

As the register/memory signal 219, "0" indicating that the addressing mode is the register is outputted and inputted to the AND gate 231.

As the second register number signal 220, a signal indicating the general purpose register R4 is outputted.

Since "1" is outputted as the subdecoder valid signal 214 and "0" is outputted as the register/memory signal 219, "0" indicating that the address calculation is not necessary is outputted from the AND gate 231 as the address calculation request signal 223.

As shown in FIG. 8C, since the first operand of the instruction code 423 has not the extension part, "X (don't care)" is outputted from the instruction code input register 210 as the extension part data signal 234.

Now, when the last microinstruction of the previous instruction is read from the micro-ROM 109, the microsequence operation "exit" is designated to the instruction execution control unit control circuit 256 by the microsequence control signal 261. Thereby the above-mentioned signals are respectively held in the registers 224 to 230 in synchronism with the clock φ2, and respectively inputted to the registers 204 to 245, microaddress input selector 252 and instruction execution finish signal 263.

Also, at this time, since the address calculation request signal 223 is "0", as is shown in FIG. 4, the instruction execution control unit control circuit 256 controls the microaddress input selector 252 to select the main microaddress signal 212 held in the register 224.

Thus, in the microaddress input register 253, the start address of the microprogram routine "movs" is held in synchronism with the clock φ1 in the second machine cycle as the address of the micro-ROM 109.

The "movs" routine is read from the micro-ROM 109 according to the address held in the microaddress input register 253, and held in the micro-ROM output register 254 in synchronism with the clock φ2 and decoded by the microdecoder 255 for processing.

The above operation corresponds to "START"→Step S23 in the flowchart shown in FIG. 11.

In the "movs" routine, a value of the register (=R3) designated by the operation code is transferred to and stored in the register (=R4) designated by the register number of the operand designating part and the memory write register 305, via the S1 bus 301, ALU 309 and D bus 303.

Though the microsequence control signal 261 designating the next microsequence operation becomes "go/ex", since the address calculation request signal 223 is "0", as is shown in FIG. 4, the instruction execution control unit control circuit 256 controls the microaddress input selector 252 in the same way as the case of microsequence operation "exit" to finish the instruction processing.

In such a manner, the value of the general purpose register R3 is transferred to the general purpose register R4.

The instruction is executed in one step, "START"→ Step S23 →"END" in the flowchart shown in FIG. 11.

(D) Memory to memory transfer of short type (refer to FIG. 11)

The short instruction execution sequence, in which a register relative indirect addressing mode is designated by the second operand, is described.

The instruction code 424 shown in FIG. 8D, specifically, writes a value of the general purpose register R5 of the general purpose register file 308 into the memory 104 of address "R6+1000 (hexadecimal)".

In the same way as the aforementioned instruction codes, first 2 bytes of the instruction code are decoded at first.

Decode results are as shown in a column (D) of FIG. 9.

Signals outputted from the main decoder 211 are as follows.

As the main microaddress signal 212, the start address of the microprogram routine "movs" is outputted.

As the operand fetch request signal 213, "0" indicating that the operand is not to be fetched is outputted.

As the subdecoder valid signal 214, "1" indicating that the decode result of the subdecoder 217 is valid is outputted and inputted to the AND gate 231.

As the first register number signal 215, a signal indicating the general purpose register R5 is outputted.

Signals outputted from the subdecoder 217 are as follows.

As the sub-microaddress signal 218, "@Rn+exp" is outputted.

As the register/memory signal 219, "1" indicating that the addressing mode is the memory 104 is outputted and inputted to the AND gate 231.

As the second register number signal 220, a signal indicating the general purpose register R6 is outputted.

Since "1" is outputted as the subdecoder valid signal 214 and "1" is outputted as the register/memory signal 219, "1" indicating that the address calculation is necessary is outputted from the AND gate 231 as the address calculation request signal 223.

As shown in FIG. 8D, since the second operand of the instruction code 424 includes the extension part, "00001000 (hexadecimal)" is outputted from the instruction code input register 210 as the extension part data signal 234.

Now, when the last microinstruction of the previous instruction is read from the micro-ROM 109, the microsequence operation "exit" is designated to the instruction execution control unit control circuit 256 by the microsequence control signal 261. Thereby, the above-mentioned signals are respectively held in the registers 224 to 230 in synchronism with the clock φ2, and respectively inputted to the registers 204 to 245, microaddress input selector 252 and instruction execution finish signal 263.

Also, at this time, since the address calculation request signal is "1", as is shown in FIG. 4, the instruction execution control unit control circuit 256 controls the microaddress input selector 252 to select the sub-microaddress signal 218 held in the register 225.

Thus, in the microaddress input register 253, a start address of the microprogram routine "@Rn+exp" is held, in synchronism with the clock φ1, in the second machine cycle as the address of the micro-ROM 109.

While, the main microaddress signal 212 indicating the start address of the microprogram routine "movs" outputted from the instruction decoding unit 107 is held in the register 240 of the instruction execution control unit 108, in synchronism with the clock φ1 in the second machine cycle, and further, is held is register 246 of the instruction execution control unit 108 in synchronism with the clock φ2.

The "@Rn+exp" routine is read from the micro-ROM 109 according to address held in the microaddress input register 253, and held in the micro-ROM output register 254 in synchronism with the clock 100 2 and decoded by the microdecoder 255 for processing.

The above operation corresponds to "START"→Step S21 in the flowchart shown in FIG. 11.

The "@Rn+exp" routine is a microprogram routine which performs the register relative indirect address calculation.

A value of the general purpose register designated by the operand designating part (here, the general purpose register R6 of the general purpose register file 308 is designated) is outputted to the S1 bus 301, a value "00001000 (hexadecimal)" of the extension part is outputted to the S2 bus 302, and a value obtained by adding the two values to each other in the ALU 309 is outputted to the D bus 303 and set in the memory address register 306.

Though the microsequence control signal 261 designating the next microsequence operation becomes "go/ret", since the operand fetch request signal 213 is "0", as is shown in FIG. 4, the instruction execution control unit control circuit 256 controls the microaddress input selector 252 in the same way as as the case of microsequence operation "return".

That is, the next microprogram address becomes the main microaddress signal 212 held in the register 246 of the instruction execution control unit 108, and the start address of the microprogram routine "movs" is indicated.

The above operation corresponds to Step S21 →Step S23 in the flowchart shown in FIG. 11.

In the "movs" routine, a value of the general purpose register R5 designated by a register number in the operation code is transferred to and stored in a register designated by a register number of the operand designating part (since it is not designated here, it is not written into any register) and the memory write register 305, via the S1 bus 301, ALU 309 and D bus 303.

Though the microsequence control signal 261 designating the next microsequence operation becomes "go/ex", since the address calculation request signal 223 is "1", as is shown in FIG. 4, the instruction execution control unit control circuit 256 controls the microaddress input selector 252 in the same way as the case of microsequence operation "goto".

As a jump destination of the microsequence operation "goto", address of a routine "write" for memory write is designated by the next microaddress signal 262. In the routine "write", the memory write register 305 is written with a value of the memory address register 306 as the address.

The above operation corresponds to Step S23 →Step S 24 in the flowchart shown in FIG. 11.

Then, the microsequence operation becomes "exit" and the instruction processing is finished.

In such a manner, by the instruction code 424 shown in FIG. 8D, the value of tile general purpose register R5 of the general purpose register file 308 is written into an address "R6+1000 (hexadecimal)" of the memory 104.

The instruction is executed as "START"→Step S21 → Step S23 →Step S24 →"END" in the flowchart shown in FIG. 11.

Though the operation "read" shown in FIG. 11 as Step S22 is necessary in case of reading the first operand from the memory, it is not necessary in the example shown herein.

As particularly described heretofore, according to the data processor of the present invention, since hardware control is effected to execute the microprogram for address calculation, only when an addressing mode necessitating the address calculation is designated, it is not necessary to determine the addressing mode in the microprogram. Also, since it is all right to prepare only the same number of microprograms for address calculation as the addressing modes, a rapid instruction execution and reduction of the microprogram size can be realized.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalence of such meets and bounds thereof are therefore intended to be embraced by the claims.

What is claimed is:

1. A data processor which, with use of a microprogram, controls execution of instructions each having an instruction code including an operation designating part and an operand designating part, comprising:

decoding means for decoding the instruction code to generate, a first microprogram address for instruction execution from a field including the operation designating part of the instruction code, a second microprogram address for operand address calculation from a field including the operand designating part of the instruction code, and a first control signal indicating whether said second microprogram address is valid or invalid from a part of or entire instruction code;

microinstruction storing means for storing a plurality of microinstructions each having a microsequence field for designating a microprogram sequence to be executed next;

microaddress storing means for scoring an address of the microinstruction to be read from said microinstruction storing means next for execution;

microaddress selecting means for selecting one of said first microprogram address, said second microprogram address and a third microprogram address stored in said microaddress storing means so as to store a selected one of said first microprocessor address, said second microprocessor address and said third microprocessor address, said third microprogram address including one or plural addresses in addition to the above-mentioned addresses and microaddress selection controlling means for controlling said microaddress selecting means to select one of the first, second and third microprogram addresses responsive to values of said first control signal and the microsequence field of the microinstruction executed immediately before the microprogram address which is to be now selected.

2. A data processor as set forth in claim 1, wherein said decoding means further generates a second control signal indicating whether or not an operand designating part exists in an instruction code, and a third control signal indicating whether or not an operand is a memory, from a part of or entire instruction code, and said decoding means further comprises means for generating said first control signal from said second and third control signals.

3. A data processor as set forth in claim 1, further comprising holding means for holding said first microprogram address generated by said decoding means for a predetermined period, and outputting it to said microaddress selecting means thereafter.

4. A data processor which, with use of a microprogram, controls execution of instructions each having an instruction code including an operation designating part and an operand designating part, comprising:

decoding means for decoding the instruction code to generate, a first microprogram address for instruction execution from a field including the operation designating part of the instruction code, a second macroprogram address for operand address calculation from a field including the operand designating part of the instruction code, a first control signal indicating whether said second microprogram address is valid or invalid from a part of or entire instruction code, and a second control signal indicating whether it is necessary or not to read the operand from a memory from a part of or entire instruction code;

microinstruction storing means for storing a plurality of microinstructions each having a microsequence field for designating a microprogram sequence to be executed next;

microaddress storing means for storing an address of the microinstruction to be read from said microinstruction storing means next for execution;

microaddress selecting means for selecting one of said first microprogram address, said second microprogram address and a third microprogram address stored in said microaddress storing means so as to store a selected one of said first microprocessor address, said second microprocessor address and said third microprocessor address, said third microprogram address including one or plural addresses in addition to the above-mentioned addresses; and microaddress selection controlling means for controlling said microaddress selecting means to select one of the first, second and third microprogram addresses, responsive to values of said first control signal and the microsequence field of the microinstruction executed immediately before the macroprogram address which is to be now selected, and to select either said first microaddress or said third microaddress, responsive to a value of said second control signal.

5. A data processor as set forth in claim 4, wherein said decoding means further generates a fourth control signal indicating whether or not an operand designating part exists in an instruction code, and a firth control signal indicating whether or not an operand is a memory, from a part of or entire instruction code, and said decoding means further comprises means for generating said first control signal from said fourth and fifth control signals.

6. A data processor as set forth in claim 4, further comprising holding means for holding said first microprogram address generated by said decoding means for a predetermined period, and outputting it to said microaddress selecting means thereafter.

7. A data processor which, with use of a microprogram, controls execution of instructions each having an instruction code including an operation designating part and an operand designating part, comprising:

decoding means for decoding the instruction code to generate, a first microprogram address for instruction execution from a field including the operation designating part of the instruction code, a second microprogram address for operand address calculation from a field including the operand designating part of the instruction code, a first control signal indicating whether said second microprogram address is valid or invalid from a part of or entire instruction code, a second control signal indicating whether it is necessary or not to read the operand from a memory from a part of entire instruction code, and a third control signal indicating whether it is necessary or not to write the operand into the memory from a part of or entire instruction code;

macroinstruction storing means for storing a plurality of microinstructions each having a macrosequence field for designating a microprogram sequence to be executed next;

microaddress storing means for storing an address of the microinstruction to be read from said microinstruction storing means next for execution;

microaddress selecting means for selecting one of said first microprogram address, said second microprogram address and a third microprogram address stored in said microaddress storing means so as to store a selected one of said first microprocessor address, said second microprocessor address and said third microprocessor address, said third microprogram address including one or plural addresses in addition to the above-mentioned addresses; and microaddress selection controlling means for controlling said microaddress selecting means to select one of the first, second and third microprogram addresses, responsive to values of said first control signal and the microsequence field of the microinstruction executed immediately before the macroinstruction which is now to be selected for execution, to select either said first microaddress or said third microaddress, responsive to a value of said second control signal, and to select one of said first, second and third microaddress, responsive to the values of said first control signal, third control signal and the microsequence field of the macroinstruction executed immediately before the microprogram address which is now to be selected.

8. A data processor as set forth in claim 7, wherein said decoding means further generates a fourth control signal indicating whether or not an operand designating part exists in an instruction code, and a firth control signal indicating whether or not an operand is a memory, from a part of or entire instruction code, and said decoding means further comprises means for generating said first control signal from said fourth and fifth control signals.

9. A data processor as set forth in claim 7, further comprising holding means for holding said first microprogram address generated by said decoding means for a predetermined period, and outputting it to said microaddress selecting means thereafter.

10. A data processor which, with use of a microprogram, controls execution of instructions each having an instruction code including an operation designating part designating a kind of instruction to be executed by an operation code, and an operand designating part designating an addressing mode for operand address calculation, comprising:

microprogram storing means for storing a plurality of microprogram routines including, a plurality of microprogram routines for instruction execution corresponding to the kinds of operation codes, and a plurality of microprogram routines for address calculation corresponding to the kinds of addressing modes;

decoding means for decoding a part of or entire instruction code to generate an address calculation valid signal indicating whether or not the instruction requires address calculation; and controlling means for controlling execution of the microprogram routines stored in said microprogram storing means, responsive to said address calculation valid signal generated by said decoding means;

wherein said controlling means reads the microprogram routine for instruction execution corresponding to the operation code of the instruction code from said microprogram storing means and executes it, when said address calculation valid signal is invalid, and reads the microprogram routine for address calculation corresponding to the addressing mode designated by the operand designating part of the instruction code from said microprogram storing means and executes it, when said address calculation valid signal is valid.

11. A data processor which, with use of a microprogram, controls execution of instructions each having an instruction code including an operation designating part designating a kind of instruction to be executed by an operation code, and an operand designating part designating an addressing mode for operand address calculation, comprising:

microprogram storing means for storing a plurality of microprogram routines including, a plurality of microprogram routines for instruction execution corresponding to the kinds of operation codes, a plurality of microprogram routines for address calculation corresponding to the kinds of addressing modes, and a microprogram routine for reading an operand from a memory;

decoding means for decoding a part of or entire instruction code to generate an address calculation valid signal indicating whether or not the instruction requires address calculation, and an operand read valid signal indicating whether or not the instruction operand is to be read from the memory; and controlling means for controlling execution of the microprogram routines stored in said microprogram storing means, responsive to said address calculation valid signal and the operand read valid signal generated by said decoding means;

wherein said controlling means reads the microprogram routine for instruction execution corresponding to the operation code of the instruction code from said microprogram storing means and executes it, when said address calculation valid signal is invalid, reads the microprogram routine for address calculation corresponding to the addressing mode designated by the operand designating part of the instruction code from said microprogram storing means and executes its when said address calculation valid signal is valid, reads the microprogram routine for memory read immediately after completing the microprogram routine for address calculation from said microprogram storing means and executes it, when said operand read valid signal is valid, and reads the microprogram routine for instruction execution immediately after completing the microprogram routine for address calculation from said microprogram storing means and executes it, when said operand read valid signal is invalid.

12. A data processor which, with use of a microprogram, controls execution of instructions each having an instruction code including an operation designating part designating a kind of instruction to be executed by an operation code, and an operand designating part designating an addressing mode for operand address calculation, comprising:

microprogram storing means for storing a plurality of microprogram routines including a plurality of microprogram routines for instruction execution corresponding to the kinds of operation codes, a plurality of microprogram routines for address calculation corresponding to the kinds of addressing modes, a microprogram routine for reading an operand from a memory, and a microprogram routine for writing the operand into the memory;

decoding means for decoding a part of or entire instruction code to generate an address calculation valid signal indicating whether or not the instruction requires address calculation, an operand read valid signal indicating whether or not the instruction operand is to be read from the memory, and an operand write valid signal indicating whether or not the instruction operand is to be written into the memory; and controlling means for controlling execution of the microprogram routines stored in said microprogram storing means, responsive to said address calculation valid signal, operand read valid signal and operand write valid signal generated by said decoding means;

wherein said controlling means reads the microprogram routine for instruction execution corresponding to the operation code of the instruction code from said microprogram storing means and executes it, when said address calculation valid signal is invalid, reads the microprogram routine for address calculation corresponding to the addressing mode designated by the operand designating part of the instruction code from said microprogram storing means and executes it, when said address calculation valid signal is valid, reads the microprogram routine for memory read immediately after completing the microprogram routine for address calculation from said microprogram storing means and executes it, when said operand read valid signal is valid, reads the microprogram routine for instruction execution immediately after completing the microprogram routine for address calculation from said microprogram storing means and executes it, when said operand read valid signal is invalid, reads the microprogram routine for memory write immediately after finishing the microprogram routine for instruction execution from said microprogram storing means and executes it, when said operand write valid signal is valid, and reads the microprogram routine corresponding to a new operation code immediately after completing said microprogram routine for instruction execution from said microprogram storing means and executes it, when said operand write valid signal is invalid.

* * * * *